United States Patent [19]

Kopp

[11] Patent Number: 4,643,318
[45] Date of Patent: Feb. 17, 1987

[54] SAFETY CLOSET ROD SYSTEM

[76] Inventor: Laurence D. Kopp, 74 B Cuba Hill Rd., Greenlawn, N.Y. 11740

[21] Appl. No.: 834,781

[22] Filed: Feb. 28, 1986

[51] Int. Cl.$^4$ ............................................. A47H 1/00
[52] U.S. Cl. ................. 211/123; 211/105.1; 248/201; 248/251; 403/2
[58] Field of Search ............. 248/251, 201, 254, 261, 248/262, 264, 268; 211/105.1, 123; 403/2

[56] References Cited

U.S. PATENT DOCUMENTS

| | | | |
|---|---|---|---|
| 2,215,331 | 9/1940 | Marsh | 248/251 |
| 2,443,149 | 6/1948 | Rundell | 248/264 |
| 2,657,894 | 11/1953 | Sklenar | 248/251 X |
| 2,905,426 | 9/1959 | Ross | 248/264 |
| 3,661,272 | 5/1972 | Di Panni | 248/251 X |
| 4,043,528 | 8/1977 | Benoit et al. | 248/201 X |
| 4,316,547 | 2/1982 | Varon | 248/251 X |
| 4,426,057 | 1/1984 | Nudo | 248/251 X |

Primary Examiner—Ramon O. Ramirez
Attorney, Agent, or Firm—Bauer & Amer

[57] ABSTRACT

A rigid rod is mounted between a pair of opposed wall brackets. At least one of the brackets is provided with an inverted U-shaped recess for receiving the end of the rod, and a pair of pegs extending cantilevered below the opening of the recesses. The pegs are spaced laterally a distance slightly less than the diameter of rod and are sufficiently rigid to hold the rod, with a normal complement of clothes, but also slightly flexible to spread apart and allow the rod to fall when the weight applied to the rod exceeds a predetermined limit.

5 Claims, 6 Drawing Figures

SAFETY CLOSET ROD SYSTEM

BACKGROUND OF THE INVENTION

The present invention relates to a safety closet rod and in particular to a closet rod which is yieldable under a predetermined weight.

Unfortunately, there are several instances wherein closet rods, mounted in the conventional manner, pose a hazard to the safety and well being of the persons using such facility. For example, mentally ill persons have been known to use such rods to hang themselves in an attempt at suicide. As another example, even normal children, who often play in closets, inadvertently become entangled in the clothes and unwittingly hurt themselves as a result. It is, therefore, advantageous to provide a closet rod installation which is capable of yielding at a predetermined weight or force applied thereto so as to prevent such tragedies.

An attempt at such an installation was made in U.S. Pat. No. 4,043,528 which provided a loop shaped bracket formed of a bent leaf spring fixedly held to the wall and further biased by a compression spring. The end of the clothes rod was inserted in the loop and on the application of an excessive force caused the leaf spring to bend out of shape allowing the rod to fall out of the loop onto the floor. It is not believed that this construction had any significant commercial success as the construction appeared relatively complex and costly as well as relatively difficult to install.

It is, therefore, an object of the present invention to provide a yieldable or "breakaway" closet rod system which is simple and inexpensive to manufacture, easy to install, and which is effective at all times to yield at a given predetermined weight.

The foregoing objects and advantages will be apparent from the following disclosure of the present invention.

SUMMARY OF THE INVENTION

According to the present invention, a safety clothes rod system is provided of the type wherein a rod is held between two brackets fastened to the wall of the closet. At least one of the brackets is formed having a pair of horizontally disposed pegs on which an end of the rod sits. The pegs are spaced apart a distance less than the diameter of the rod and are of sufficient rigidity to support the rod, when holding a weight of less than a predetermined amount. The pegs however, are of a length, diameter and material which enables them to be flexible so as to resiliently spread apart a distance at least equal to the diameter of the rod when the weight or force applied to the rod is greater than the predetermined weight. As a result, the rod breaks away, dislodges, and falls to the floor.

The "breakaway" bracket comprises a body having an inverted U-shaped recess into which the end of the rod is freely inserted. Depending from the body to the rear of the recess is a plate-like skirt from which the pegs extend outwardly and horizontally, below the recess to thereby support the rod. The body is provided with means whereby it may be fixedly attached to the closet wall or other stationary vertical support so that the bracket itself does not pull away from or separate from the wall even though the excessive weight or force is applied to the rod. Preferably, the pegs are formed of material having resiliency and memory so that they re-assume their unflexed position once the rod breaks away and, therefore, the rod can be easily replaced on the pegs.

Full details of the present invention is set forth in the following description and is illustrated in the accompanying drawings.

DESCRIPTION OF THE INVENTION

Figure 1:
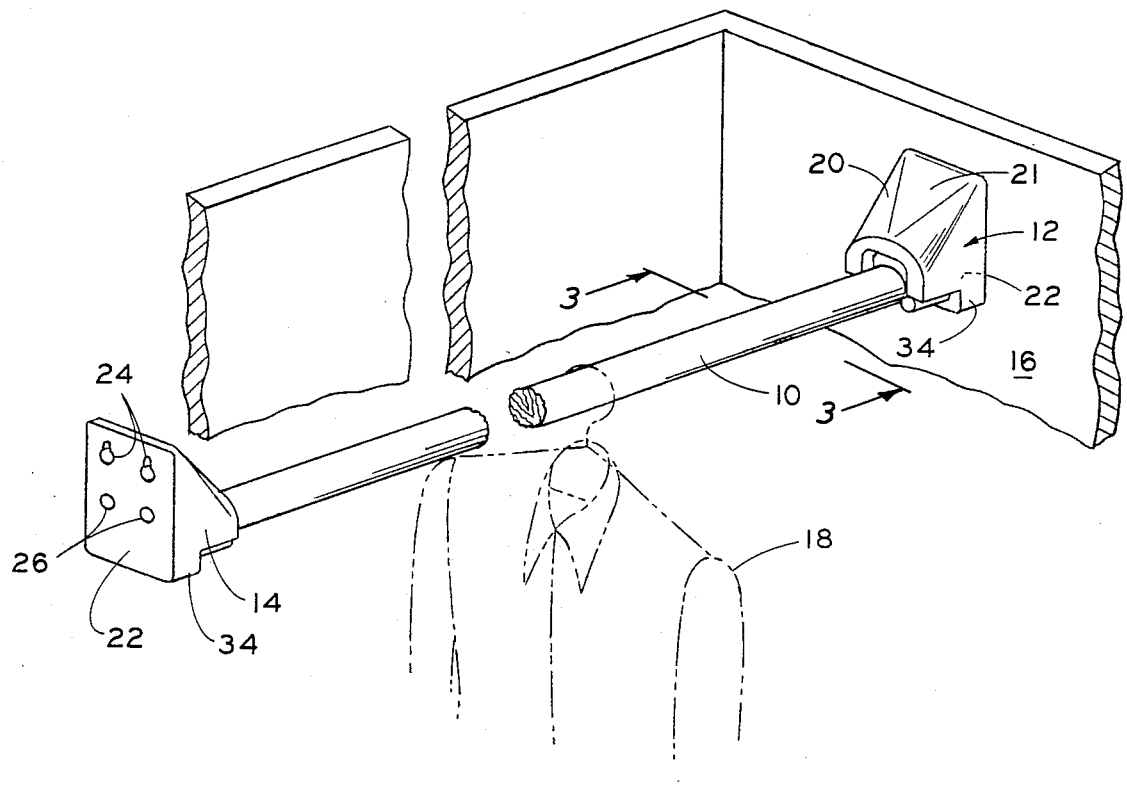
FIG. 1 is a perspective view of the safety clothes rod system of the present invention as installed in a closet structure.
Figure 2:
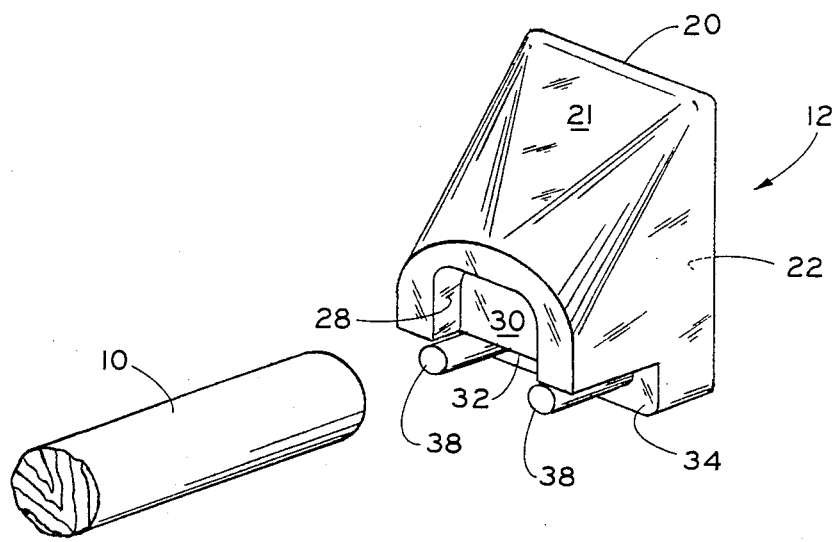
FIG. 2 is an enlarged and exploded view of the bracket body and rod of the present invention.
Figure 3:
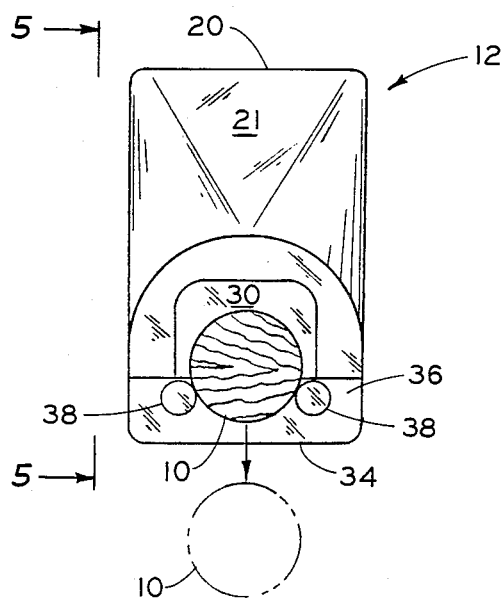
FIG. 3 is a sectional view taken in direction of line 3—3 of FIG. 1 showing the rod in cross-section and the bracket in end view with the rod supported on the pegs.

As seen in the illustrated embodiment of the invention, a clothes rod 10 is supported at each of its ends in a bracket 12 and 14 respectively. The brackets are secured fixedly to the walls 16 of a clothes closet or to other similar vertical support structure. The clothes rod 10, as illustrated, is a commercially available aluminum extruded tube of sufficient diameter to be rigid along its length when clothes, represented by the dotted outline, bearing numeral 18 are hung thereon.

At least one of the brackets, here illustrated as the bracket 12, on the right hand side of the drawing, comprises a body 20 which is shaped, as desired, to have a pleasing appearance and distinct ornamentation. The inclined outer surface 21 of the body, as illustrated in the drawings, is preferred as it leaves little opportunity to hang either hangers, cord, or other materials on the bracket itself when it is permanently installed.

The back surface 22 of the body 20 is smooth and planar so as to lie flat against the wall 16 and is provided with means for fixedly attaching it to the wall. For example, as seen on the rear surface of the bracket 14, key-shaped holes 24 are formed so that they may be placed over the heads of the screws or bolts (not shown), which have been earlier placed in the wall and on which the bracket can thus be hung. In addition or in lieu thereof, simple holes 26 can be made, entering the back of the rear surface of the body, so as to receive screws or bolts which pass directly through the wall 16 to thereby "backmount" the bracket.

In the front of the body 20 there is provided an inverted U-shaped recess 28 into which the end of the rod 10 is received. The U-shaped recess 28 prevents the upward and sideways movement of the rod but is open at its bottom to receive the rod and to permit its removal. The inner wall 30 of the U-shaped recess 28 is flat so as to conform to the end of the rod 10. It may be provided with a resilient pad or a piece of bent spring metal (neither of which are shown) in order to provide means bearing axially against the end of the rod 10, thereby preventing the rod 10 from freely shifting axially once placed within the recess 28.

Below the U-shaped recess 28, the body 20 is cut back to form an overhang 32 and also to provide a depending plate 34 having a face 36 parallel to the rear surface 22 of the body. Extending perpendicularly outwardly from the face 36 and permanently anchored in the plate 34 are a pair of horizontally disposed, laterally spaced, pegs 38 which have a length sufficient to extend cantilevered below the opening of the U-shaped recess 28, to form a support for the end of the rod 10 when the rod 10 is placed within the recess. The pegs 38 are formed as essentially rigid, non-flexible members capable of normally supporting the rod 10 when normal complement of clothes is hung thereon. However, it will be appreciated that since virtually all materials flex to a degree dependent upon their length, thickness, diameter, and shape, pegs 38 may thus be with parameters which will, nevertheless, permit them to flex or resiliently bend, to a very small degree, when a predetermined force is applied to them. Material such as aluminum, plastic, or even wood have the necessary characteristics and the pegs can be formed from any one of these materials, in a variety of sizes.

Figure 4:
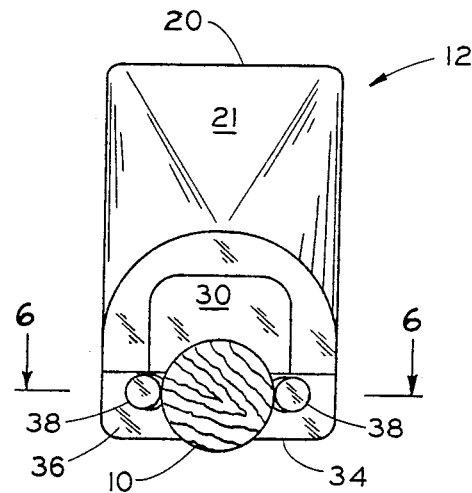
FIG. 4 is a view similar of that of FIG. 3 showing the flexing of the pegs and the "breakaway" of the rod.
Figure 5:
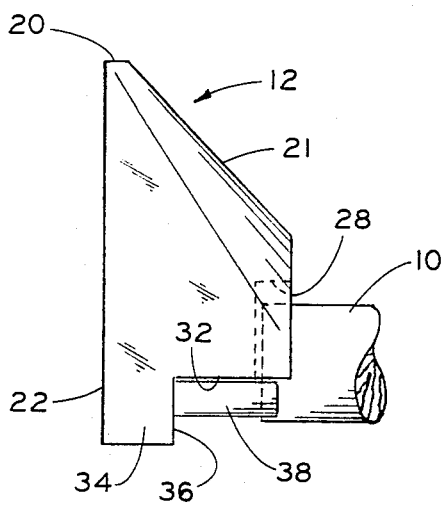
FIG. 5 is a side elevational view taken in the direction of line 5—5 of FIG. 3 illustrating the support of the rod on the pegs.
Figure 6:
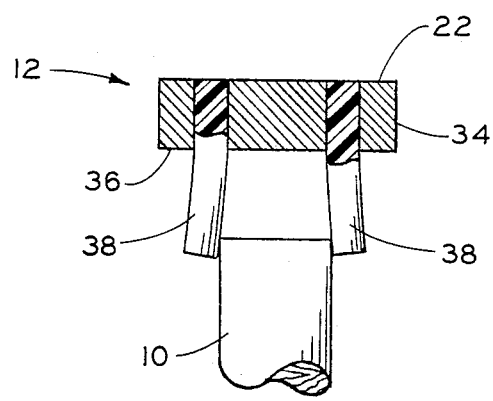
FIG. 6 is a partial sectional view taken along line 6—6 of FIG. 4 showing the rod in plan view and the pegs in partial section view.

With this in mind, the pegs 38 are arranged so as to be spaced laterally from each other a distance slightly less than the diameter of the rod 10 to thereby normally support the rod 10 without breaking, flexing, or laterally separating, when the weight applied to the rods by the mass of clothes is less than the predetermined weight, while the pegs will separate, flex, or move outwardly relative to each other as seen in FIGS. 4 and 6, when a weight or downward force, is applied to the rod, exceeding the predetermined weight. The cross-sectional shape of the rod 10 further helps in causing the pegs to separate since as the rod becomes heavier, the outside surface begins to act as a wedge in sliding engagement with the pegs 38.

Determination of the degree of flexing and/or separation is largely a function of the length and diameter of the pegs as well as of the material from which the pegs are made, these parameters can be easily determined by a simple calculation or empirically without any significant experimentation required. Of course, the breakway or release force will be chosen, no matter what material or dimension of the peg, so as to conform to the class of person most likely to use the closet. It is, therefore, possible, for example, in a children's hospital to provide a predetermined breakaway force that will be less than the force needed in a hospital for adults.

Instead of wood, aluminum, plastic, another material may be used to form the rod, and while illustrated as cylindrical, the rod may also be square, rectangular or polygonal in cross-section. Therefore, as used herein the term "rod" should not be limited to any particular shape, size or material. The diameter referred to should be taken to mean the effective, cross-sectional dimension corresponding to the diameter of a circumscribed cylinder. The term "peg" should also be taken as including circular, rectangular or polygonal shaped pegs, pins, or the like, since as explained herein, flexibility can be effected by variation of any of the discussed parameters.

Preferably, the bracket body 20 with their pegs 38 are assembled as a unitary block. When the same material is used, integral casting or molding is preferred. However, the body 20 and pegs 38 can be of different materials as shown in FIG. 6. For example, the body can be formed of wood and the pegs formed of aluminum or metal and subsequently inserted in suitable holes and cemented or secured fixedly in place. Any combination of materials can be used for the bracket body and pegs.

It will be seen from the foregoing that the clothes rod system of the present invention provides a simple, inexpensive, and effective means for supporting a predetermined amount of weight which when an overload force or excessive weight is exerted on the rod, will be caused to "breakaway" allowing the rod to freely fall to the floor. Thus, the present invention provides a very effective and suitable system for hospitals or other institutions whereby a person bent upon self-destruction, or inadvertant harm is prevented from carrying out the same.

The present invention has been described by an embodiment using a specific illustration of rod and examples of materials and construction. It is to be understood that this description is merely to facilitate an understanding of the invention and is not limiting upon the scope thereof, since other embodiments, modifications and changes will be apparent to those skilled in the art.

What is claimed is:

1. A safety clothes rod system comprising a pair of brackets adapted to be attached to opposing walls or similar vertical support and a rod extending between said brackets and held thereby, at least one of the brackets comprising a body having an inverted U-shaped recess into which the end of said rod may be inserted and a depending vertical plate member to the rear of said recess and having a pair of horizontally disposed pegs on which the ends of said rod sits extending outwardly from said plate member perpendicular thereto, said pegs being spaced apart a distance less than the diameter of said rod and of sufficient rigidity to support said rod thereon when holding a weight less than a predetermined amount, and being flexible so as to spread apart a distance at least equal to the diameter of said rod when a weight greater than said predetermined amount is applied to said rod, whereby said rod is released and falls as a consequence of having the greater weight applied thereto.

2. The system according to claim 1 wherein said base plate and said pegs are integrally molded of rigid, plastic material.

3. The system according to claim 1 wherein said base plate and said pegs are integrally cast or molded of aluminum.

4. The system according to claim 1 wherein said base plate is formed of one material and said pegs are formed of another material, said pegs being fixedly secured within holes within said base plate.

5. The system according to claim 1 wherein said base plate is provided on its rear surface with mounting holes.

* * * * *